United States Patent [19]

Mitsugi

[11] Patent Number: 5,485,385
[45] Date of Patent: Jan. 16, 1996

[54] MAGNETIC AZIMUTH SENSOR COMPENSATION APPARATUS FOR VEHICLE NAVIGATION SYSTEM AND METHOD THEREOF

[75] Inventor: Tatsuya Mitsugi, Hyogo, Japan

[73] Assignee: Mitsubishi Denki Kabushiki Kaisha, Tokyo, Japan

[21] Appl. No.: 417,277

[22] Filed: Apr. 5, 1995

Related U.S. Application Data

[63] Continuation of Ser. No. 173,279, Dec. 27, 1993, abandoned, which is a continuation of Ser. No. 735,284, Jul. 24, 1991, abandoned.

[30] Foreign Application Priority Data

Sep. 19, 1990 [JP] Japan .................... 2-247235

[51] Int. Cl.$^6$ .................... G01C 17/00; G01C 21/04
[52] U.S. Cl. .................... 364/449; 364/444; 364/454; 364/571.05; 364/457; 364/571.04; 364/460; 364/443; 342/457; 342/357; 340/995; 340/988; 340/990; 73/178 R
[58] Field of Search .................... 364/449, 444, 364/454, 450, 443, 571.02, 457, 571.05, 460; 340/995, 988, 990, 870.32; 73/178 R; 318/587; 342/451, 452, 457, 357

[56] References Cited

U.S. PATENT DOCUMENTS

| | | | |
|---|---|---|---|
| 4,470,119 | 9/1984 | Hasebe et al. | 364/454 |
| 4,521,777 | 6/1985 | Nakamura et al. | 364/460 |
| 4,571,684 | 2/1986 | Takanake et al. | 340/995 |
| 4,734,863 | 3/1988 | Honey et al. | 340/988 |
| 4,743,913 | 5/1988 | Takai | 342/457 |
| 4,819,175 | 4/1989 | Wuttke | 340/990 |
| 4,837,700 | 6/1989 | Ando et al. | 364/449 |
| 4,841,449 | 6/1989 | Suyama | 364/449 |
| 4,852,012 | 7/1989 | Suyama | 364/457 |
| 4,862,398 | 8/1989 | Shimizu et al. | 364/457 |
| 4,890,233 | 12/1989 | Ando et al. | 364/460 |
| 4,891,760 | 1/1990 | Kashiwazaki et al. | 364/449 |
| 4,903,212 | 2/1990 | Yokouchi et al. | 364/449 |
| 4,924,402 | 5/1990 | Ando et al. | 364/449 |
| 4,982,332 | 1/1991 | Saito et al. | 364/449 |
| 5,058,023 | 10/1991 | Kozikaro | 364/449 |
| 5,084,822 | 1/1992 | Hayami | 364/449 |
| 5,089,826 | 2/1992 | Yano et al. | 364/449 |
| 5,109,344 | 4/1992 | Kakihara et al. | 364/449 |
| 5,117,363 | 5/1992 | Akiyama et al. | 364/449 |
| 5,124,924 | 6/1992 | Fukushima et al. | 364/449 |
| 5,155,688 | 10/1992 | Tanaka et al. | 364/449 |
| 5,235,514 | 8/1993 | Matsuzaki | 364/454 |
| 5,251,139 | 10/1993 | Takano et al. | 364/454 |
| 5,276,626 | 1/1994 | Ihara et al. | 364/457 |
| 5,283,743 | 2/1994 | Odagawa | 364/457 |
| 5,287,297 | 2/1994 | Ihara et al. | 364/571.02 |
| 5,297,050 | 3/1994 | Ichimura et al. | 364/444 |

FOREIGN PATENT DOCUMENTS

| | | |
|---|---|---|
| 2910386 | 9/1980 | Germany . |
| 2-194313 | 7/1990 | Japan . |
| 2-193010 | 7/1990 | Japan . |
| 2126040 | 3/1984 | United Kingdom . |

OTHER PUBLICATIONS

Ein Neuer Markt erwacht; In: Funkschau, Issue 19, Jan. 1989, pp. 24, 25, 28, 31 (English Translation Attached).
Patents Abstracts of Japan, p. 515, Nov. 13, 1986, vol. 10/No. 334.

Primary Examiner—Kevin J. Teska
Assistant Examiner—Jacques H. Louis-Jacques

[57] ABSTRACT

A motor vehicle-mounted navigation apparatus comprising an input section adapted for inputting data based on GPS positioning, an azimuth sensor and distance sensor adapted for establishing independent navigation signal input sections for inputting data relating to a present position of motor vehicle and an azimuth thereof based on self-determining type navigation. The motor vehicle-mounted navigation apparatus further includes a control unit for determining the present position of the motor vehicle based on the obtained data through the input sections as described above, whereby error correction for the azimuth sensor is implemented by feeding back an output signal the control unit.

24 Claims, 4 Drawing Sheets

MAGNETIC AZIMUTH SENSOR COMPENSATION APPARATUS FOR VEHICLE NAVIGATION SYSTEM AND METHOD THEREOF

This is application is a continuation of application Ser. No. 08/173,279 filed on Dec. 27, 1993, now abandoned; which is a continuation of application Ser. No. 07/735,284, filed Jul. 24, 1991, now abandoned.

BACKGROUND OF THE INVENTION

1. Field of the Invention

This invention relates to a navigation apparatus for vehicles and, more particularly, to a vehicle-mounted navigation apparatus which performed is error correction of an azimuth sensor which constitutes an input section for an independent navigation signal.

2. Description of the Prior Art

Currently, a navigation apparatus in accordance with a Global Positioning System (GPS) is quite effective for locating positions of various crafts such as sea vessels, aircraft and automobiles and has become popular. Such a navigation apparatus can determine or confirm vehicle's present position, traveling speed, and the like by receiving satellite signals transmitted by a plurality of artificial satellites. The Global Positioning System (GPS) is a kind type of satellite-based radio navigation system developed to determine the present position of a moving vehicle by receiving satellite signals from a plurality of artificial satellites known as GPS satellites.

As is well known, the positioning operation to be implemented by the GPS positioning apparatus is normally performed by receiving satellite signals transmitted from three or more GPS satellites. To determine the present position of the moving vehicle, the satellite signals transmitted by the plurality of GPS satellite are received simultaneously by a GPS receiver mounted on the moving vehicle such as a motor vehicle, and thereby a distance from each satellite is measured based on a time difference between clocks mounted on the motor vehicle and each of the GPS satellites.

Further, as a prior-art-type navigation apparatus, an independent or so-called self-determining type positioning apparatus is known for use by the motor vehicles. The self-determining type positioning apparatus is so arranged, different from the aforementioned GPS type navigation apparatus, as to determine its own present position based on data obtained independently without relying upon other data fed by any external units such as from the artificial satellites.

In accordance with the prior-art-type motor vehicle-mounted navigation apparatus, an earth magnetism sensor is employed as an azimuth sensor which constitutes a part of input sections for an independent navigation signal, however, there may cause a phenomenon of magnetization depending on a magnetic environment, this in turn results in problems such as introducing an error into the calculated present position of the motor vehicle.

It is therefore an object of this invention to eliminate the problems encountered by the prior-art-type navigation systems and to provide a motor vehicle-mounted navigation apparatus wherein error corrections for an azimuth sensor are implemented by feeding back an output signal of a control unit.

SUMMARY OF THE INVENTION

A motor vehicle-mounted navigation apparatus in accordance with this invention comprises an input section adapted for establishing a GPS navigation signal input section for inputting data based on GPS positioning, an azimuth sensor and distance sensor adapted for establishing independent navigation signal input sections for inputting data relating to a present position of a motor vehicle and an azimuth thereof based on self-determining type navigation, and a display control unit for processing to determine the present position of the motor vehicle based on the obtained data through the input sections as described above.

In accordance with this invention, the error corrections for the azimuth sensor, which sensor constitutes a part of the input sections for inputting the independent navigation signal, is performed by feeding back an output signal of the display control unit to the azimuth sensor.

DETAILED DESCRIPTION OF THE PREFERRED EMBODIMENT

Figure 1:
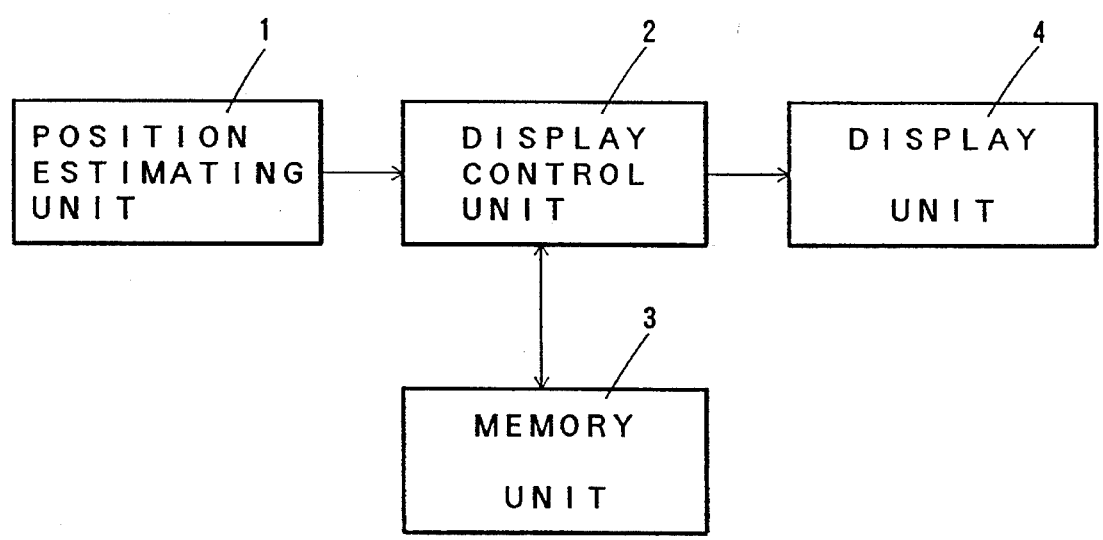
FIG. 1 is a schematic block diagram showing an embodiment of this invention.

Referring to FIG. 1, there is shown a schematic block diagram of an embodiment of this invention, wherein a position estimating unit 1 is provided for estimating a present position of the motor vehicle and is connected to a display control unit 2 hereinafter described. The display control unit 2 is provided for displaying geographical data relating to the present position of the motor vehicle by utilizing a display unit 4, which will, be described hereinafter, and thereby required geographical data stored in a memory unit 3 are selected and displayed on the display unit 4.

Figure 2:
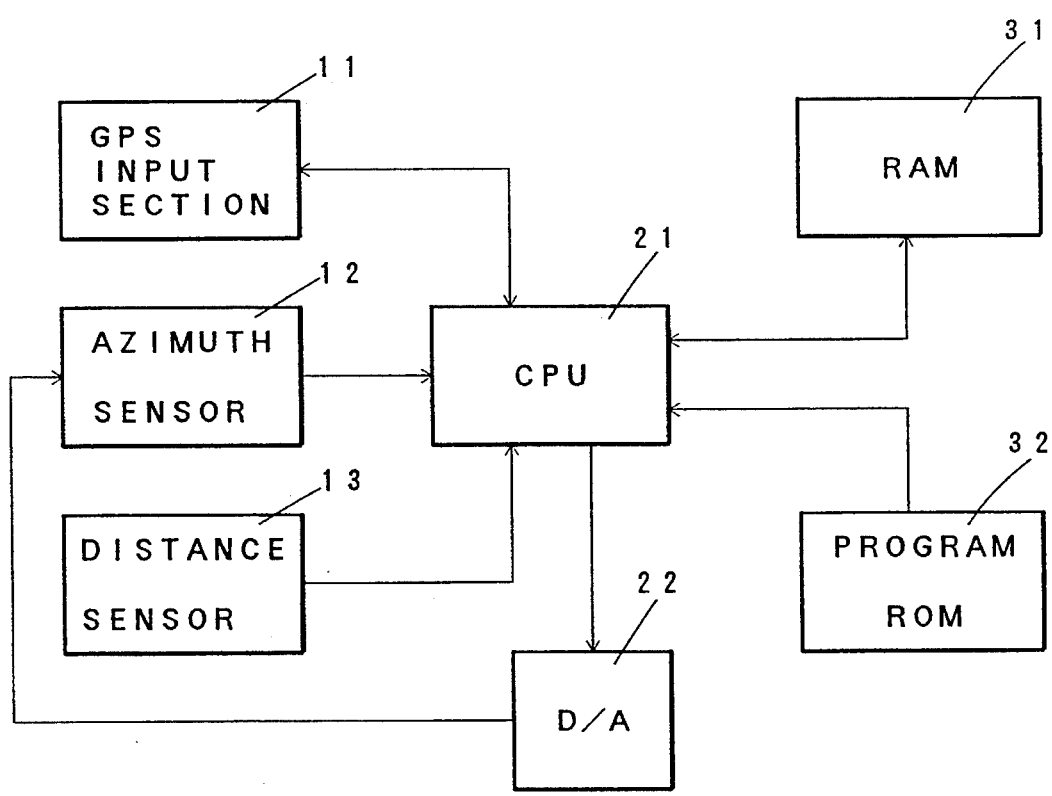
FIG. 2 is a block diagram showing the embodiment of FIG. 1 more specifically.

FIG. 2 is a block diagram showing, more specifically, the main part of the embodiment of FIG. 1. In the configuration shown in FIG. 2, a GPS input section 11, an azimuth sensor 12 and a distance sensor 13 are provided for inputting information relating to the present position of the motor vehicle, and the various input data fed through the sensors are applied to an appropriate microcomputer including a central processing unit (CPU) 21 for estimating the present position of the motor vehicle, this set up corresponds to the position estimating unit 1 of FIG. 1. Further, the CPU 21 also corresponds to the display control unit 2 of FIG. 1 together with a digital-to-analog (D/A) convertor 22 interposed between the CPU 21 and the azimuth sensor 12. A RAM 31 is provided for storing intermediate data, to be read or written, representing results of intermediate operation as well as resultant data to be output or displayed at the final stage. A program ROM 32 is provided for storing various programs to be implemented by the CPU 21. These memories 31 and 32 correspond to the memory unit 3 of FIG. 1. Although it is not shown in FIG. 2, a display unit that corresponds to the display unit 4 of FIG. 1 may be comprised of a thin film transistor (TFT) type liquid crystal display unit.

Figure 3:
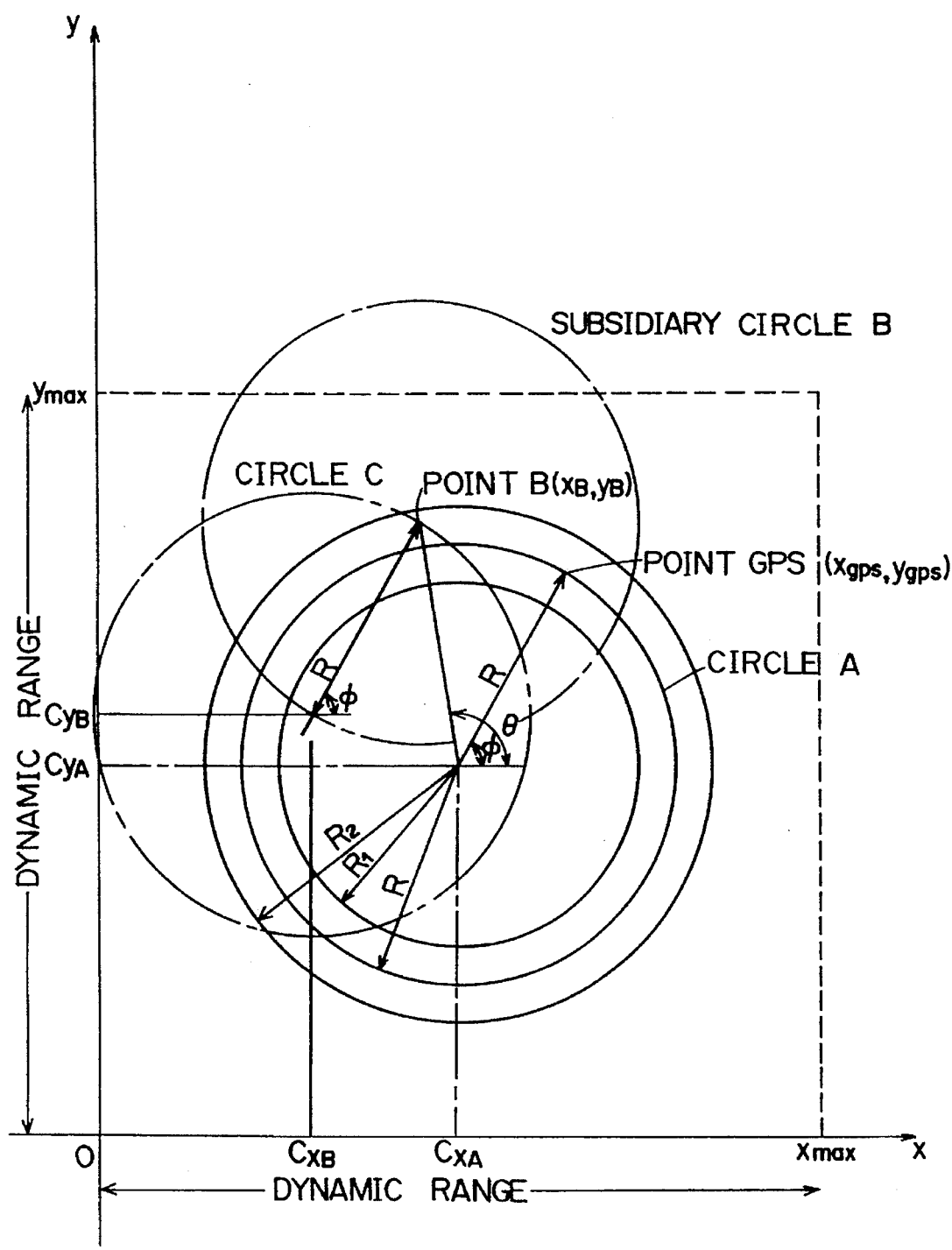
FIG. 3 is a diagram illustrating operational features of the embodiment of FIG. 1.

FIG. 3 is a diagram for illustrating the operation of the embodiment of this invention as described above. The required correcting operation will be described by referring to FIG. 3 when an earth magnetism sensor is employed as the azimuth sensor 12.

The earth magnetism sensor is on a locus of circle A when there is no magnetization.

That is, a point (xA, yA) to be measured will be given by an equation of a circle centering an initial bias (CxA, CyA) for the earth magnetism sensor as a center axis.

Consequently, since the radius of the circle A is fixed to R by the earth magnetism sensor, the equation of circle is given by:

$$(xA-CxA)^2+(yA-CyA)^2=R^2$$

where xA=Rcos θ+CxA yA=Rsin θ+CyA (1) If a point (xB, yB) to be measured is in the vicinity of the circle A, or if it is given by:

$$R1^2<(xB-Cx)^2+(yB-Cy)^2<R2^2$$

an azimuth φ is obtained through the GPS and it is assumed that the point is on the locus of circle A, hence an azimuth vector (xC, yC) for the GPS is given by:

xC=Rcos φ+CXA yC=Rsin φ+CyA (1.1) If the point (xB, yB) to be measured is equal to the GPS azimuth vector (xC, yC), the earth magnetism sensor is considered to be normal.

Azimuth data are given by the following equation of circle having a radius of R and (CxA, CyA) as the center thereof:

$$(xB-CxA)^2+(yB-CyA)^2=R^2$$

where xB=Rcos θ+CxA yB=Rsin θ+CyA thus outputting (xB, yB) or θ.

(1.2) If the point (xB, yB) to be measured is different from the GPS azimuth vector (xC, yC), it is determined that there is an error in the earth magnetism sensor and the following correction will be implemented. A circle B having a radius of R is defined as centering the point (xB, yB). If it is assumed that (CxB, CyB) is an unknown quantity [variable of track]. The point in question will be on a circle given by:

$$(xB-CxB')^2+(yB-CyB')^2=R^2$$

where

CxB'=RcosK+xB

CyB'=RsinK+yB since the azimuth of φ is given by the GPS, by assigning K=φ+π, the point (CxB, CyB) on the circle B will be fixed by the following:

CxB=–Rcosφ+xB

CyB=–Rsinφ+yB

The obtained (CxB, CyB) will constitute the center for the corrected earth magnetism sensor.

Accordingly, by assuming a circle C with a radius of R about the center of (CxB, CyB), the point (xB, yB) to be measured by the error corrected earth magnetism sensor will be on a locus of the following equation of circle C.

That is:

$$(xB-CxB)^2+(yB-CyB)^2=R^2$$

where xB=Rcos θ+CxB yB=Rsin η+CyB

Discrimination of a dynamic range (1.2.1) If 0<R+CxB<Xmax, and 0<R+CyB<ymax.

The following equation of circle having a radius of R about the center of (CxB, CyB) will be given:

$$(xB-CxB)^2+(yB-CyB)^2=R^2$$

where xB=Rcos θ+CxB yB=Rsin θ+CyB thus outputting (xB, yB) or θ as a resultant.

$$\text{If} \quad -R + CxB \leq 0, \text{or} \qquad (1.2.2)$$
$$R + CxB \geq x_{max}$$
$$\text{or} \quad -R + CyB \leq 0, \text{or}$$
$$R + CyB \geq y_{max},$$

an error indication will be displayed, and then a correcting voltage will be applied from the exterior to the CPU 21 so that the point (CxB, CyB) will be given by:

CxB=CKA, and CyB=CyA (2) If the point B to be measured is not in the vicinity of the circle $A_1$, the error indication will be displayed. Further, finding the center of an imaginary circle, a locus of which passes through the point B to be measured is performed as described in 1.2.

Thus,

CxB=–Rcos φ+xB

CyB=–Rsin φ+yB whereby, an correcting voltage will be applied from the exterior so as to be:

CxB=CxA, and CyB=CyA

Figure 4:
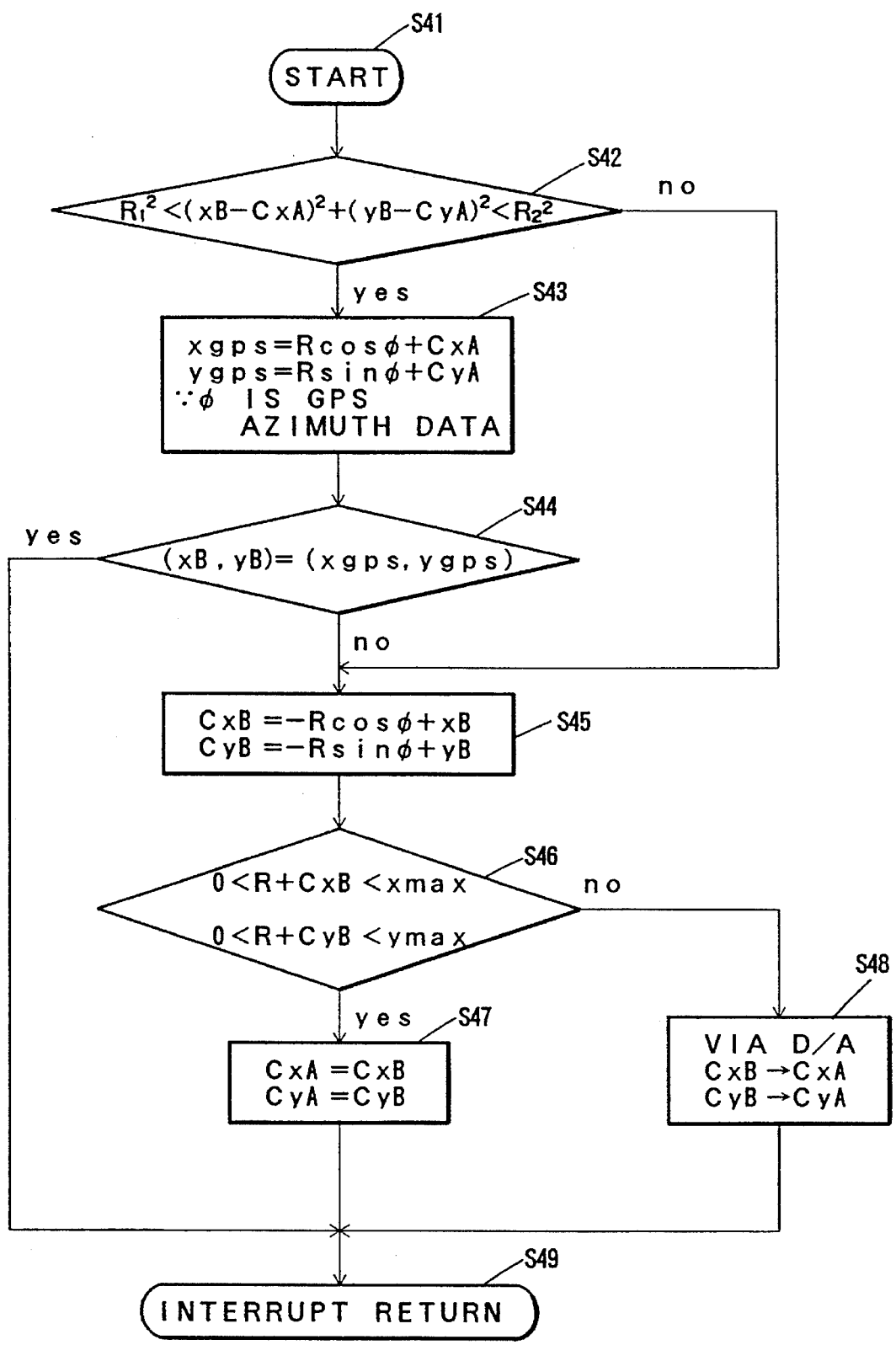
FIG. 4 is a flowchart showing operational steps to be implemented by the embodiment of FIG. 1.

Now referring to FIG. 4, there is shown a flowchart for illustrating the operation of the embodiment as described above.

As seen in the flowchart, when the earth magnetism sensor is adapted for the azimuth sensor which constitutes a part of the: input sections for the self-determining type navigational signal, a precise error correction can be implemented based on required GPS data even if there are errors causing from the magnetization of the motor vehicle body, and providing high accuracy in the operation of positioning.

Upon initiation of the navigation apparatus (step S41), it is determined at step S42 whether or not a point to be measured is in the vicinity of the circle A. If it is not, the program goes to step S45, whereas if it is, the GPS azimuth vector (xgps, ygps) or (xC, yC) is calculated at step S43 and the program goes to step S44. At step S44, it is then checked whether or not the point (xB, yB) coincides with the GPS azimuth vector (xgps, ygps). If it does it is determined that the earth magnetism sensor is normal and outputs (xB, yB) or an azimuth θ, whereas if it does not, it is determined that there is an error in the earth magnetism sensor and calculate a new center (CxB, CyB) for a circle C with a radius of R which provides new azimuth data through the earth magnetism sensor being corrected. It is then determined at step S46 whether or not the circle B is within the maximum dynamic range of the earth magnetism sensor. If it is, the circle C with new center (CxB, CyB) is adopt for establishing the azimuth data, whereas if it is not, it is determined that there is an error and the center (CxB, CyB) is brought to be equal to the center (CxA, CyA) at step S48 by applying a correcting voltage from the exterior for further computation.

As it has been described above, according to the present invention, even if the earth magnetism sensor is adapted for the azimuth sensor which forms a part of the self-determining type navigational signal input sections, an error relating to the present position to be introduced by the magnetic environment within the motor vehicle can be corrected adequately.

It is to be understood by those skilled in the art that the foregoing descriptions relate only to preferred embodiment of the invention and that various changes and modifications maybe made in the invention without departing from the spirit and scope thereof.

What is claimed is:

1. A vehicle-mounted navigation apparatus comprising:

a magnetic azimuth sensor for establishing first azimuth data by detecting magnetic field of the earth;

a distance sensor establishing distance data indicative of a moving distance of a vehicle;

means for calculating first position data indicative of a calculated present position of said vehicle by using said magnetic azimuth sensor and said distance sensor;

means for calculating biased center data of said magnetic azimuth sensor based on said first position data;

a global positioning system establishing second position data indicative of an actual present position of said vehicle;

means for calculating second azimuth data indicating an azimuth of said vehicle by using said biased center data and said second position data established by said global positioning system;

means for comparing said first position data and said second position data; and means for establishing compensation data for compensating said biased center data based on said second azimuth data and said first position data to obtain new center data of said magnetic azimuth sensor when said first position data and said second position data are not substantially equal.

2. The vehicle-mounted navigation apparatus of claim 1, wherein said compensation data is fed back to said magnetic azimuth sensor via a digital/analog converter.

3. The vehicle-mounted navigation apparatus of claim 1, further including memory for storing geographical data.

4. The vehicle-mounted navigation apparatus of claim 1, further including display means for displaying the calculated present position of said motor vehicle and surrounding data.

5. The vehicle-mounted navigation apparatus of claim 4, wherein said display means includes a liquid crystal display unit.

6. The vehicle-mounted navigation apparatus of claim 1, wherein said compensation data is represented by a circle of radius R, centered about a point (Xb, Yb) indicative of said calculated present position as follows:

$$(Xb-CxB')^2+(Yb-CyB')^2=R^2$$

where

CxB'=RcosK+x B,

CyB'=RsinK+Yb, and

K=a Constant.

7. A method of compensating a navigation system having a magnetic azimuth sensor for detecting magnetic field of the earth and a global positioning system, comprising the steps of:

(a) establishing first azimuth data by said magnetic azimuth sensor;

(b) establishing distance data indicative of a moving distance of a vehicle;

(c) calculating first position data indicative of a calculated present position of said vehicle by using said first azimuth data and said distance data;

(d) calculating biased center data of said magnetic azimuth sensor based on said first position data;

(e) establishing second position data indicative of an actual present position of said vehicle by said global positioning system;

(f) calculating second azimuth data indicating an azimuth of said vehicle by using said biased center data and said second position data established by said step (e);

(g) comparing said first position data and said second position data; and (h) establishing compensation data for compensating said biased center data based on said second azimuth data and said first position data to obtain new center data of said magnetic azimuth sensor when said first position data and said second position data are not substantially equal.

8. The method of claim 7, wherein said compensation data is fed back via a digital/analog converter.

9. The method of claim 7, further comprising the step of:

displaying said calculated present position of the vehicle and surrounding geographical data.

10. The method of claim 9, wherein said calculated present position of the vehicle and surrounding geographical data is displayed on a liquid crystal display unit.

11. The method of claim 7, wherein said compensation data is represented by a circle of radius R, centered about a point (Xb, Yb) indicative of said calculated present position as follows:

$$(Xb-CxB')^2+(Yb-CyB')^2=R^2$$

where

CxB'=RcosK+x B,

CyB'=RsinK+Yb, and

K=a Constant.

12. A vehicle-mounted navigation apparatus comprising:

a magnetic azimuth sensor for establishing azimuth data by detecting earth's magnetism;

a distance sensor for establishing distance data indicative of a moving distance of a vehicle;

means for calculating first position data indicative of a calculated present position of said vehicle by using said magnetic azimuth sensor and said distance sensor;

means for calculating biased center data of said magnetic azimuth sensor based on said first position data;

a global positioning system establishing second position data indicative of an actual present position of said vehicle;

means for determining whether the second position data established by said global positioning system is within a predetermined range of said biased center data;

means for calculating second azimuth data indicating an azimuth of the vehicle from said second position data and said biased center data when said first position data is within a predetermined range;

means for comparing said second azimuth data with said first position data;

means for outputting said first position data when said second position data and said first position data are substantially equal;

correcting means for correcting a magnetization error introduced in said first position data caused in a magnetic environment by calculating new center data of said magnetic azimuth sensor from said first position data and said second azimuth data; and means for outputting said new center data of said magnetic azimuth sensor if the new center data is within a dynamic range of said magnetic azimuth sensor, and applying a correcting voltage to said new center data if the new center data is outside said dynamic range of said magnetic azimuth sensor so that the new center data is kept within said dynamic range.

13. The vehicle-mounted navigation apparatus of claim 12, wherein the new center data is fed back to said magnetic azimuth sensor via a digital/analog converter.

14. The vehicle-mounted navigation apparatus of claim 12, further including memory means for storing geographical data.

15. The vehicle-mounted navigation apparatus of claim 12, further including display means for displaying a present position of a motor vehicle including said sensor means and surrounding data.

16. The vehicle-mounted navigation apparatus of claim 15, wherein said display means includes a liquid crystal display unit.

17. The vehicle-mounted navigation apparatus of claim 12, wherein the new center data is represented by a circle of radius R, centered about point (Xb, Yb) as follows:

$$(Xb-CxB')^2+(Yb-CyB')^2=R^2$$

where
CxB'=RcosK+x B,
CyB'=RsinK+Yb, and
K=a Constant.

18. A method of compensating a navigation system having a magnetic azimuth sensor for detecting magnetic field of the earth and a global position system, comprising the steps of:

(a) establishing magnetic azimuth data by said magnetic azimuth sensor;

(b) establishing distance data indicative of a moving distance of a vehicle;

(c) calculating first position data indicative of a calculated present position of said vehicle by using said magnetic azimuth data and said distance data;

(d) calculating biased center data of said magnetic azimuth sensor based on said first position data;

(e) establishing second position data indicative of an actual present position of said vehicle by said global positioning sensor;

(f) determining whether the second position data established by said step (e) is within a predetermined range of said biased center data;

(g) calculating said second azimuth data indicating an azimuth of the vehicle from said second position data and said biased center data when said first position data is within a predetermined range;

(h) comparing said second azimuth data with said first position data;

(i) outputting said first position data when said second position data and said first position data are substantially equal;

(j) correcting a magnetization error introduced in said first position data caused in a magnetic environment by calculating new center data of said magnetic azimuth sensor from said first position data, and said second azimuth data; and (k) outputting said new center data of said magnetic azimuth sensor if the new center data is within a dynamic range of said magnetic azimuth sensor, and applying a correcting voltage to said new center data if the new center data is outside said dynamic range of said magnetic azimuth sensor so that the new center data is kept within said dynamic range.

19. The method of claim 18, wherein the new center data is fed back via a digital/analog converter.

20. The method of claim 18, further comprising the step of:

f) displaying a calculated present position of the vehicle being navigated and surrounding geographical data.

21. The method of claim 20, wherein the calculated present position of the vehicle and surrounding geographical data is displayed on a liquid crystal display unit.

22. The method of claim 18, wherein the new center data is represented by a circle of radius R, centered about point (Xb, Yb) as follows:

$$(Xb-CxB')^2+(Yb-CyB')^2=R^2$$

where
CxB'=RcosK+x B,
CyB'=RsinK+Yb, and
K=a Constant.

23. A vehicle-mounted navigation apparatus comprising:

a magnetic azimuth sensor for establishing first azimuth data by detecting magnetic field of the earth;

distance sensor for establishing distance data indicative of a moving distance of a vehicle;

means for calculating first position data indicative of a calculated present position of said vehicle by using said magnetic azimuth sensor and said distance sensor;

means for calculating biased center data of said magnetic azimuth sensor based on said first position data;

a global positioning system establishing second position data indicative of an actual present position of said vehicle;

means for calculating second azimuth data indicating an azimuth of said vehicle by using said biased center data and said second position data established by said global positioning system;

means for comparing said first position data and said second position data;

means for establishing compensation data for compensation said biased center data based on said second azimuth data and said first position data when said first position data and said second position data are not substantially equal; and means for providing said compensation data to said magnetic azimuth sensor to compensate said first azimuth data of said magnetic azimuth sensor.

24. A method of compensating a navigation system having a magnetic azimuth sensor for detecting magnetic field of the earth and a global positioning system, comprising the steps of:

(a) establishing first azimuth data by said magnetic azimuth sensor;

(b) establishing distance data indicative of a moving distance of a vehicle;

(c) calculating first position data indicative of a calculated present position of said vehicle by using said first azimuth data and said distance data;

(d) calculating biased center data of said magnetic azimuth sensor based on said first position data;

(e) establishing second position data indicative of an actual present position of said vehicle by said global positioning system (f) calculating second azimuth data indicating an azimuth of said vehicle by using said biased center data and said second position data established by said step (c);

(g) comparing said first position data and said second position data;

(h) establishing compensation data for compensating said biased center data based on said second azimuth data and said first position data when said first position data and said second position data are not substantially equal; and (i) providing said compensation data to said magnetic azimuth sensor to compensate an output signal of said magnetic azimuth sensor.

* * * * *